United States Patent [19]

Kosalos et al.

[11] Patent Number: 5,200,931

[45] Date of Patent: Apr. 6, 1993

[54] VOLUMETRIC AND TERRAIN IMAGING SONAR

[75] Inventors: James G. Kosalos, Kirkland; Stephen J. Szender; James L. Roberts, both of Seattle; John D. Schlatter, Edmonds, all of Wash.

[73] Assignee: Alliant Techsystems Inc., Edina, Minn.

[21] Appl. No.: 717,353

[22] Filed: Jun. 18, 1991

[51] Int. Cl.$^5$ .............................................. G01S 15/89
[52] U.S. Cl. ...................................... 367/88; 367/11
[58] Field of Search ............... 367/88, 7, 11; 342/191, 342/25

[56] References Cited

U.S. PATENT DOCUMENTS

| | | | |
|---|---|---|---|
| 4,355,311 | 10/1982 | Jain | 367/88 |
| 4,400,803 | 8/1983 | Spiess et al. | 367/88 |
| 4,551,724 | 11/1985 | Goldstein et al. | 367/88 |
| 4,635,240 | 1/1987 | Geohegan et al. | 367/89 |
| 4,703,462 | 10/1987 | Woodsum | 367/99 |
| 4,815,045 | 3/1989 | Nakamura | 367/88 |
| 4,912,685 | 3/1990 | Gilmour | 367/88 |
| 4,924,448 | 5/1990 | Gaer | 367/88 |
| 4,939,700 | 7/1990 | Breton | 367/88 |
| 4,974,213 | 11/1990 | Siwecki | 367/88 |

OTHER PUBLICATIONS

"High Resolution Swath Bathymetry and Side-Scan Sonar Mapping; SeaMARC/S," by D. M. Hussong, J. G. Blackinton and J. F. Campbell, Seafloor Surveys International, Inc., Sep. 1987.

"Three-Dimensional Modeling of Seafloor Backscatter from Sidescan Sonar for Autonomous Classification and Navigation," by W. K. Stewart, *Proceedings of the 6th International Symposium on Unmanned Untethered Submersible Technology*, Jun. 12-14, 1989.

"Three-Dimensional Map Generation from Side-Scan Sonar Images," by J. M. Cuschieri and M. Hebert, *Journal of Energy Resources Technology*, vol. 112, Jun. 1990, pp. 96-102.

"Proceesing of SeaMARC Swath Sonar Data," A. Malinverno, M. H. Edwards and W. B. F. Ryan, *IEEE Journal of Oceanic Engineering*, vol. 15, No. 1, Jan. 1990, pp. 14-23.

"Constrained Iterative Deconvolution Applied to Sea-MARC I Sidescan Sonar Imagery," by C. G. Fox, F. J. Jones and Tai-Kwan Lau, *IEEE Journal of Oceanic Engineering*, vol. 15, No. 1, Jan. 1990, pp. 24-31.

"Digital Image Processing Techniques for Enhancement and Classification of SeaMARC II Side Scan Sonar Imagery," by T. B. Reed IV and D. Hussong, *Journal of Geophysical Research*, vol. 94, Jun. 10, 1989, pp. 7469-7490.

*Primary Examiner*—Daniel T. Pihulic
*Attorney, Agent, or Firm*—Merchant, Gould, Smith, Edell, Welter & Schmidt

[57] ABSTRACT

A method and apparatus for the generation of a three-dimensional image representing structures detected within a volume. Two dimensional differential phase measurements are made on backscatter signals. Azimuth, elevation and range are calculated over a statistically large number of spatially diverse backscatter returns and used to construct a histogram of backscatter data. The histogram of backscatter data can be processed with standard image processing techniques to produce terrain maps or volumetric models of the volume of water. A system constructed according to the methods of this invention is capable of producing a three-dimensional map of the volume insonified without mechanical array scanning or electronic beam scanning. A combination of two or more volumetric scanning systems can be used to increase the resolution achievable in modelling the volumetric area.

34 Claims, 16 Drawing Sheets

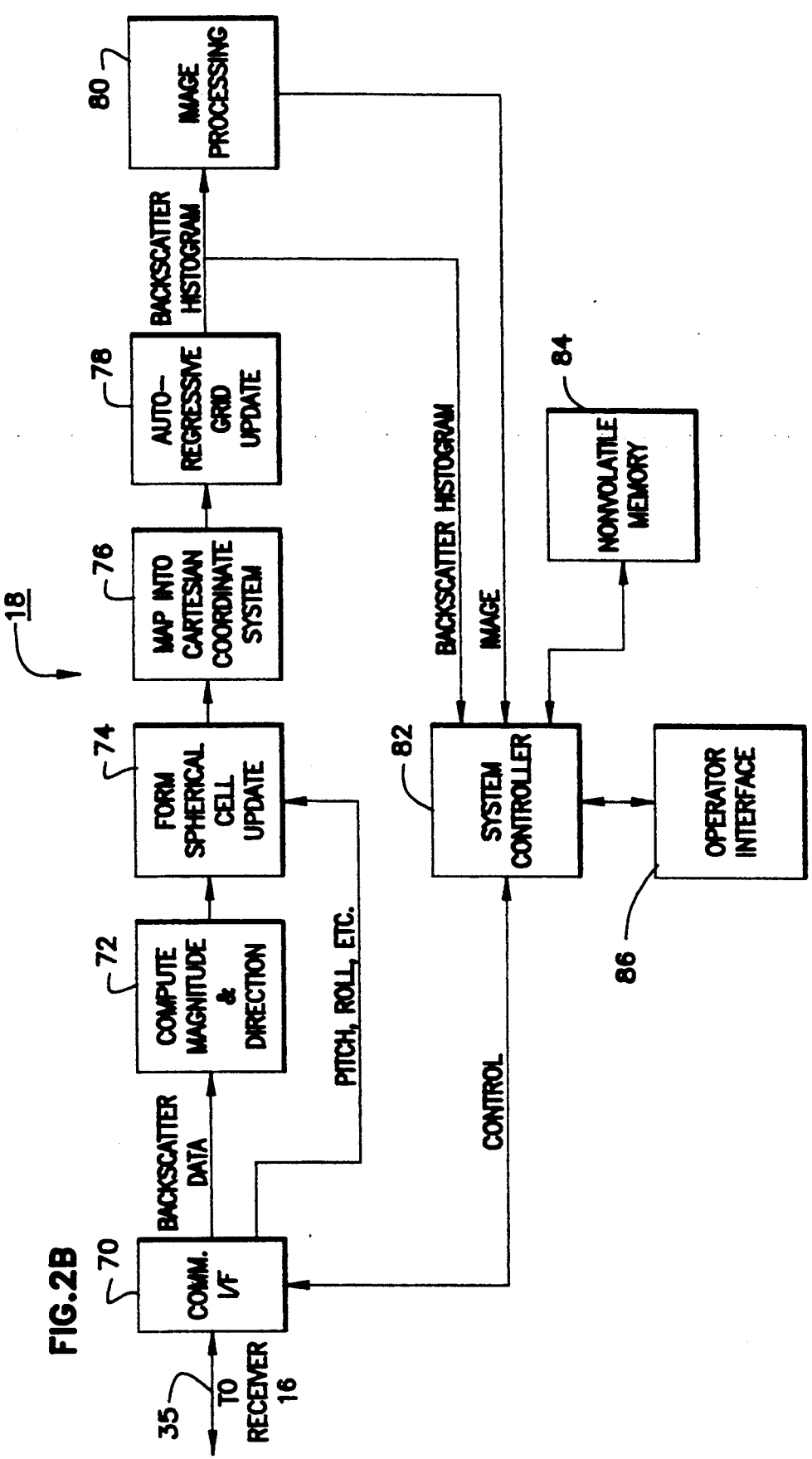

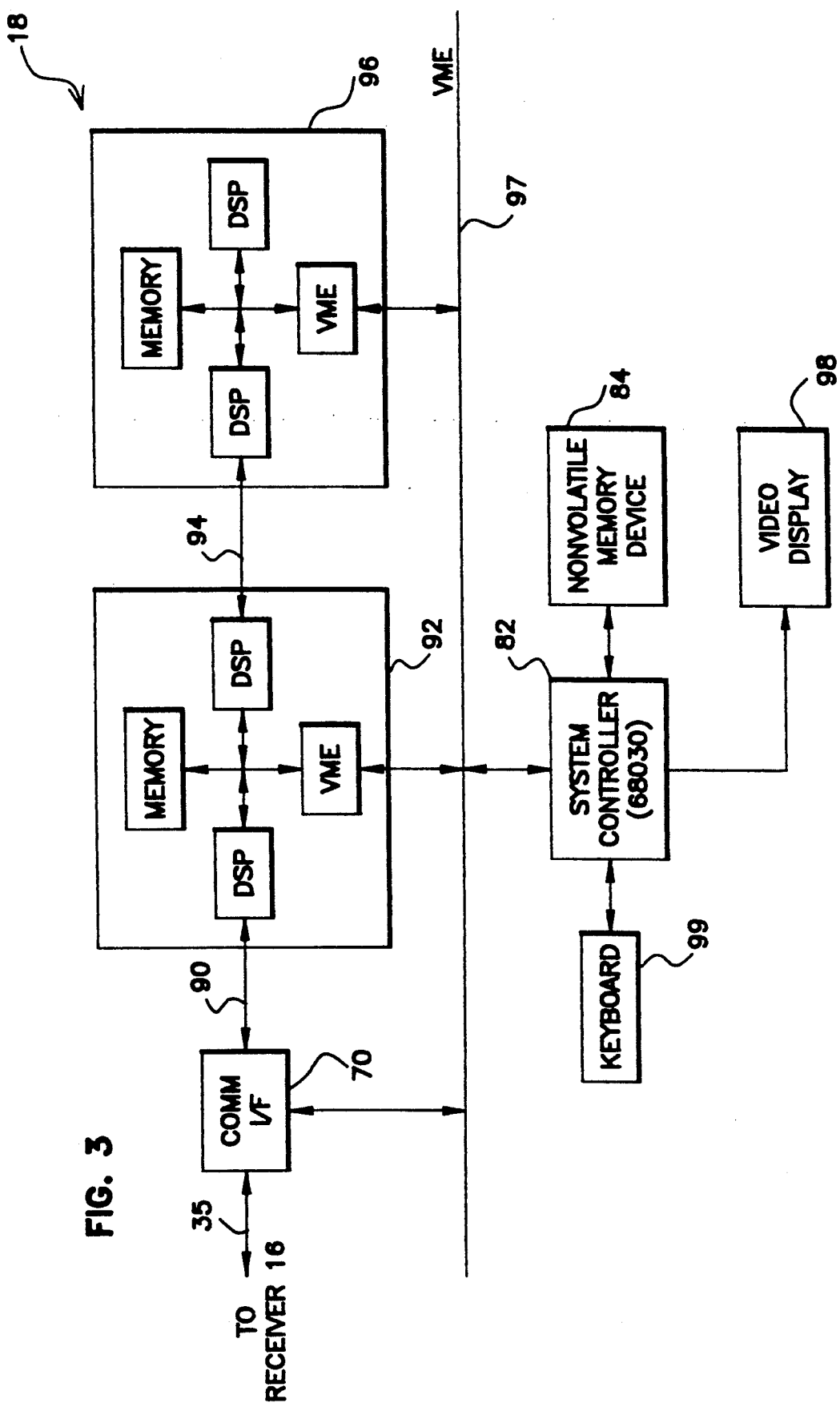

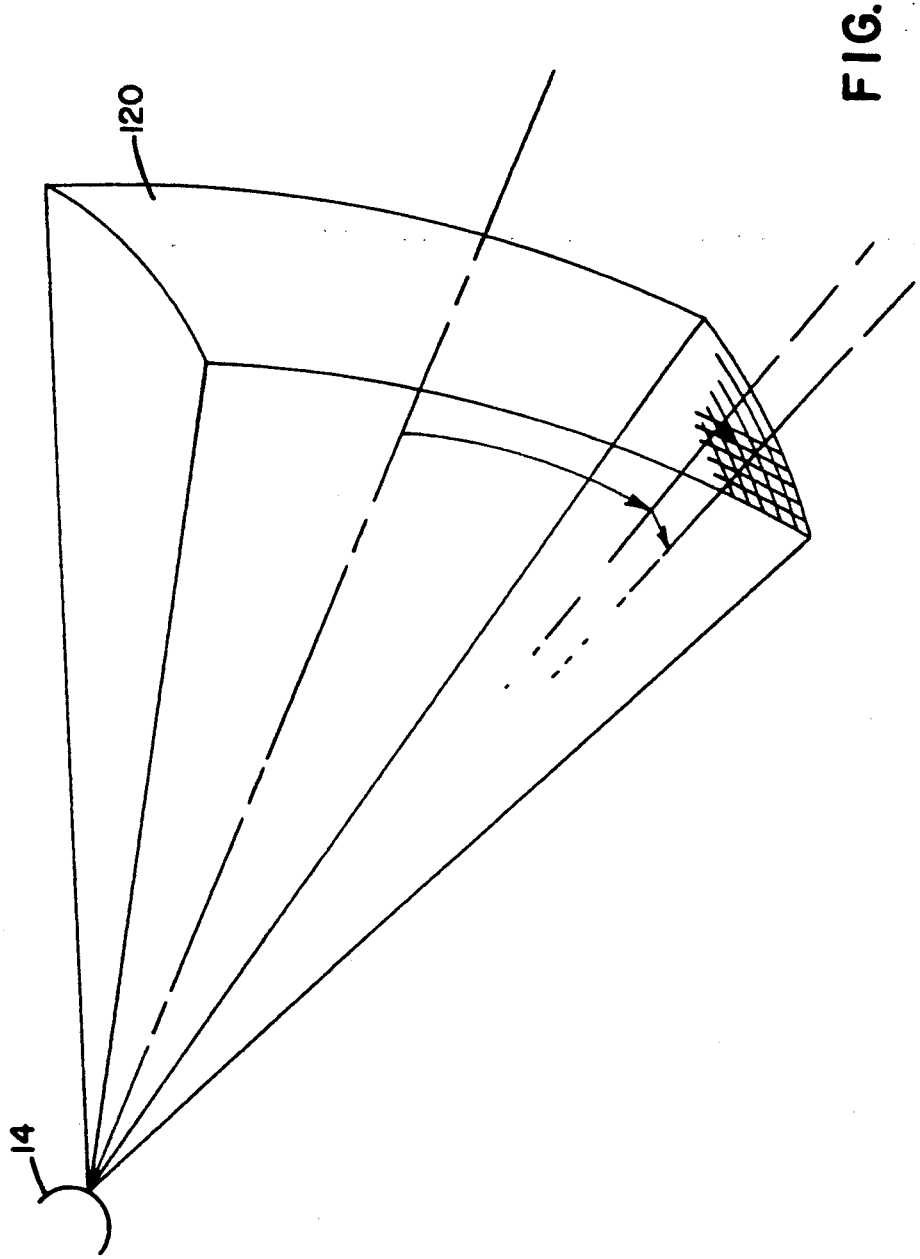

VOLUMETRIC AND TERRAIN IMAGING SONAR

BACKGROUND OF THE INVENTION

1. Field of the Invention

This invention relates generally to methods of forming three-dimensional images using sonar. In particular, the present invention provides a method and apparatus for developing a statistical model of a volume of space for use in applications such as terrain mapping, terrain following and obstacle avoidance.

2. Background Information

Accurate three-dimensional representations of the underwater environment are critical for applications such as autonomous vehicle guidance, identification of underwater objects and terrain profiling. However generating such a representation is often a difficult and time-consuming process.

Existing systems use a variety of methods to achieve varying levels of approximations to the underwater environment. One such system is the sidescan sonar system. In sidescan sonar systems, arrays of elements are used to generate a beam that is narrow in the horizontal direction (approximately 1.5 degrees) but relatively wide (on the order of 50 degrees) in the vertical direction. This narrow fan beam illuminates a swath of terrain perpendicular to the direction traveled by the sonar system. Backscatter signals from the underwater structures illuminated with the beam are recorded over time and mapped to a row of pixels that represents the terrain illuminated with that insonification.

The original sidescan sonars measured backscatter intensity against time of arrival. The backscatter intensity measured as a function of time was then mapped to a grid of pixels. This mapping was performed under the assumption that the terrain was level. The level-bottom assumption can lead to the formation of artifacts in the terrain map due to acoustic shading.

An article entitled "Three-Dimensional Modeling of Seafloor Backscatter from Sidescan Sonar for Autonomous Classification and Navigation" by W. Kenneth Stewart published in *The Proceedings of the 6th International Symposium on Unmanned Untethered Submersible Technology* in June 1989 discusses problems such as acoustic shading. Stewart proposed the use of bathymetric data to enhance terrain maps generated by sidescan sonar systems. Recent sidescan sonars have included a second array of sonar elements parallel to the original array elements. The addition of this second array of elements permits the calculation of the angle of arrival of a backscatter signal. This angle of arrival data is used to construct a bathymetric model of the terrain illuminated by that insonification. The bathymetric model is then used to correct the terrain map.

Bathymetric corrected sidescan sonar provides a fairly accurate representation of the terrain. However it is fairly time consuming and requires at least one pass over the terrain before the data can be used for autonomous vehicle guidance.

Other approaches to three-dimensional image generation using active sonar systems are discussed in an article entitled "Three-Dimensional Map Generation From Side-Scan Images" by J. M. Cuschieri and M. Hebert published in *Transactions of the ASME*, Vol. 112, June 1990. Cuschieri and Hebert describe the use of forward looking systems similar to side-scan systems that are capable of mapping the area in front of an autonomous vehicle. These systems generate a beam that is similar to the side-scan beam (narrow in the horizontal direction and wide in the vertical direction). In addition, they are capable of steering the beam either mechanically or electronically to illuminate more than one vertical swath of the volume in front of the vehicle.

Forward looking sonars of this type increase in complexity with increasing horizontal resolution. The horizontal resolution of such systems is a function of the horizontal width of the beam and the number of discrete angles illuminated in the horizontal direction. A forward looking system with high resolution in both the horizontal and the vertical direction would be prohibitively expensive.

Finally, systems have been proposed that form a three-dimensional image from a single active sonar transmission. Such a system typically requires that the system insonify the entire volume of interest and then use complex beamforming techniques to sense the amplitude of the backscatter from each of the points within that volume. The resolution of such a system is directly dependent on the number of beams formed and narrowness that can be achieved for each beam.

Systems that can form a three-dimensional image from a single active sonar transmission are limited only by the speed of image processing and the number of beams formed. Since current systems are limited in the number of beams by the cost of the system and the complexity of the electronics, the result is typically a blurred image with contrast limited by the sidelobe levels achieved by the array/beamformer.

As can be seen from the above discussion, methods for generating a representation of a three-dimensional image vary in speed, effectiveness and practicality. It is clear that there has existed a long and unfilled need in the prior art for a simple, effective method of generating a three-dimensional image of a volume of water that can be used for such applications as guiding an autonomous vehicle. The present invention meets this need while avoiding these and other shortcomings of the techniques known in the prior art.

SUMMARY OF THE INVENTION

To overcome the limitations in the prior art discussed above, and to overcome other limitations readily recognizable to those skilled in the art, this invention provides a method and apparatus for the generation of a three-dimensional image representing structures detected within a volume. Two dimensional differential phase measurements are made on backscatter signals. Azimuth, elevation and range are calculated over a statistically large number of spatially diverse backscatter returns and used to construct a histogram of backscatter data. The histogram of backscatter data can be processed with standard image processing techniques to produce terrain maps or volumetric models a volumetric area. A system constructed according to the methods of this invention is capable of producing a three-dimensional map of the volume insonified without mechanical array scanning or electronic beam scanning.

According to the present invention, a volumetric scanning sonar system comprises a projector for generating acoustic signals used to insonify a volumetric area, a receiver for receiving backscatter signals reflected from structures within the volumetric area and a processor for determining the range and angle of arrival of the backscatter signal. Angle of arrival data is merged with range and amplitude data to construct a three-dimensional backscatter histogram.

According to another aspect of the present invention, the combination of two or more volumetric scanning systems can be used to increase the resolution achievable in modelling the volumetric area.

According to yet another aspect of the present invention, a method of collecting backscatter data is disclosed which includes dividing a volume into a plurality of ranges, capturing backscatter signals reflected from structures within each range, measuring parameters of the captured backscatter signals and storing those parameters for further processing.

According to yet another aspect of the present invention, a method of mapping terrain is disclosed which includes dividing a volume into a plurality of equal-sized cubes, recording backscatter data determined to have been reflected from structures within each cube and using the recorded backscatter data to determine the surface of structures within the volume.

BRIEF DESCRIPTION OF THE DRAWINGS

In the drawings, where like numerals refer to like elements throughout the several views;

FIGS. 2a-2b show a functional block diagram of a volumetric scanning sonar system compatible with the present invention;

FIG. 3 shows a board level diagram of the preferred embodiment of a processor compatible with the present invention;

FIG. 7 is a typical graphical representation of a spherical coordinate system compatible with the present invention;

DETAILED DESCRIPTION OF THE PREFERRED EMBODIMENT

In the following detailed description of the preferred embodiment, reference is made to the accompanying drawings which form a part hereof, and in which are shown by way of illustration specific embodiments through which the invention may be practiced. It is to be understood that other embodiments may be utilized and structural changes made without departing from the scope of the present invention.

Figure 1:
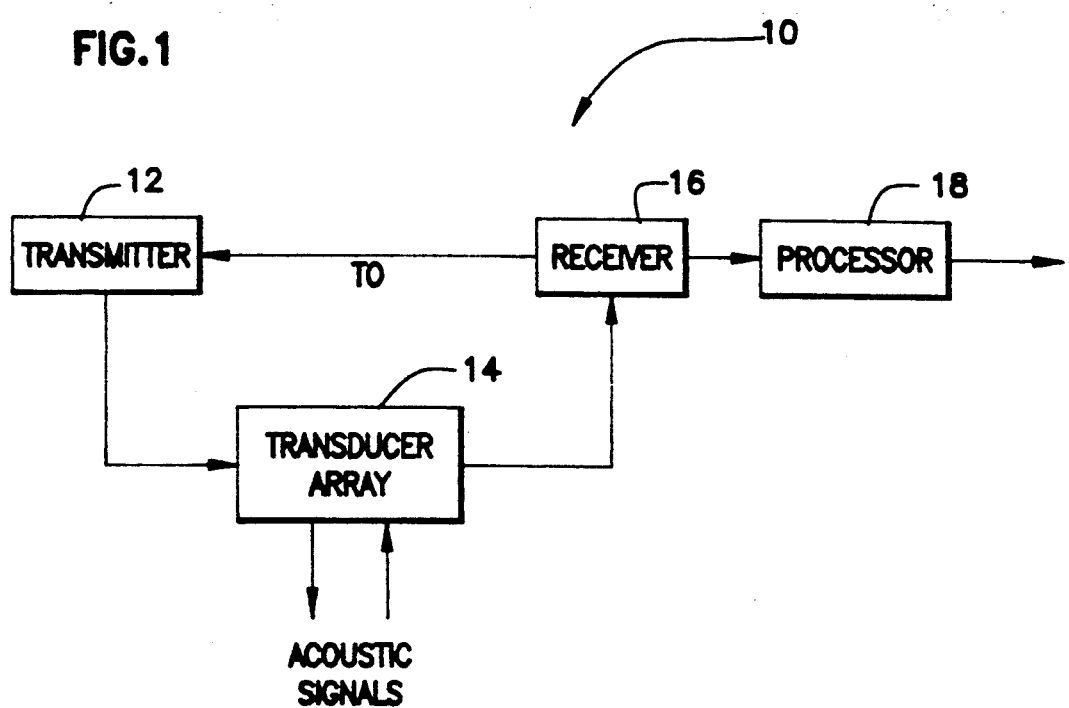
FIG. 1, illustrates the major components of a volumetric scanning sonar system compatible with the present invention.

FIG. 1 is a functional block diagram illustrating preferred major components of a volumetric scanning sonar system 10 compatible with the present invention. Transducer array 14 is shown connected to transmitter 12 and receiver 16. Array 14 receives pulsed signals from transmitter 12 and generates acoustic signals of the same pulse width and interval. Array 14 also listens for return acoustic signals and converts them to electrical signals that are sent to receiver 16.

Transmitter 12 is also shown connected to receiver 16. Receiver 16 generates a synchronizing signal T0 at a pulse repetition rate selected by processor 18. Signal T0 may be used by transmitter 12 to initiate an acoustic signal transmission or ping. Receiver 16 uses a passive protection network to protect its high gain receiver circuits.

In the embodiment shown, receiver 16 is connected to processor 18 and sends processor 18 backscatter data, other sensor data (such as pitch and roll) and notification that a T0 signal has occurred. Processor 18 can, in turn, control the amplitude, repetition rate and pulse width generated by transmitter 12.

Pulses generated by transmitter 14 are received by transducer array 14 and converted to acoustic signals in a method well known in the art. The acoustic signals travel through the water and are reflected from structures in the water. Some portion of the reflected acoustic signals return to impact array 14 where they are converted to electrical signals. Receiver 16 receives the electrical signals, amplifies them and converts the amplified signals to sampled backscatter data. In the preferred embodiment, processor 18 receives these digital representations of the reflected acoustic signals and processes them to form a histogram of backscatter data.

Figure 2A:
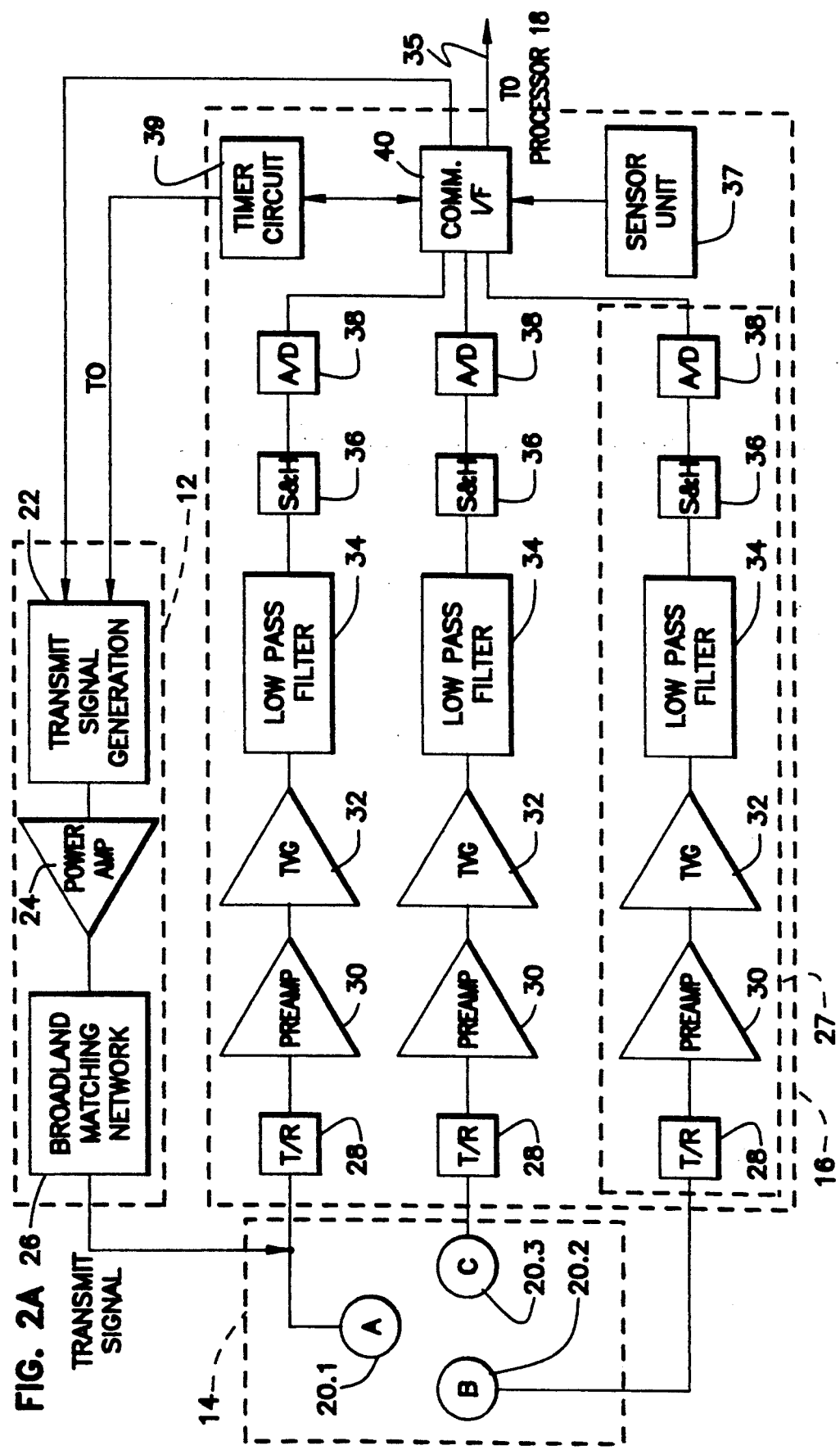

A more detailed functional block diagram of the preferred embodiment is illustrated in FIGS. 2a and 2b. FIG. 2a shows transducer array 14 as an array of three transducer elements 20 constructed with elements 20 arranged in an equilateral triangle configuration with the face of the triangle parallel to the array face. The centers of the three transducer elements 20 are separated by approximately half a wavelength.

Transmitter 12 is illustrated as transmit generation circuit 22 connected through power amplifier 24 to broadband matching network 26. In the preferred embodiment, one of the elements 20 is used as an acoustic signal projector. This is shown in FIG. 2a where the transmit signal sourced by network 26 terminates on transducer element 20.1.

Receiver 16 connects to transmitter 12, transducer array 14 and processor 18. Each element 20 of transducer array 14 is processed by a separate receiver channel 27. Signals from an element 20 pass through transmitted energy protection circuit 28 to preamp 30. Energy protection circuit 28 is a passive protection network which limits the signal to the preamp to prevent over driving. Preamp 30 amplifies the received backscatter signal and passes it on to time varying gain amplifier 32. Time varying gain amplifier 32 amplifies the backscatter signal as a function of the time to compensate for attenuation through the water. The resulting signal is passed through a low pass filter 34 to sample and hold (S+H) circuit 36. The sampled signal is converted to a digital representation in analog/digital converter (A/D) circuit 38 and passed through communications interface 40 to processor 18 via a serial data line 35. In the preferred embodiment, A/D 38 must be able to quantize to at least twelve bits to achieve the desirable accuracy.

FIG. 2a shows a timer circuit 39 connected to transmit generation circuit 22 and communications interface 40. Timer circuit 39 operates off the system clock to feed a synchronizing signal to transmitter 12 and processor 18. In the case of transmitter 12, signal line T0 provides the synchronizing signal each time the transmitter is supposed to issue an acoustic signal. In the case of processor 18, timer circuit 39 inserts a T0 data word just ahead of the stream of backscatter sampling data sent through communications interface 40 to processor 18. This alerts processor 18 to the arrival of backscatter data. Communications interface 40 also is the conduit by which processor 18 can control the pulse repetition rate generated by timer circuit 39.

FIG. 2a shows a sensory unit 37 connected to communications interface 40. Sensory unit 37 measures such things as transducer array angle and altitude. This data is sent to processor 18 to be used to correct azimuth, elevation and range calculated from the differential phase measurements.

In addition, in the preferred embodiment, communications interface 40 is connected to transmit generation circuit 22 in order for processor 18 to control ping amplitude and pulse width.

FIG. 2b shows a communications interface 70 connected to compute section 72 and spherical update section 74. Compute section 72 is connected to spherical update section 74. Spherical update section 74 is connected to Cartesian mapping section 76. Cartesian mapping section 76 is connected to autoregressive grid update section 78. Image processing section 80 is connected to autoregressive grid update section 78 and system controller 82. System controller 82 is connected to communications interface 70, nonvolatile memory 84 and operator interface 86.

Communications interface 70 communicates with receiver 16 over serial data line 35. Compute section 72 receives sampled backscatter data from communications interface 70 and calculates magnitude and angle of arrival for each sample. Spherical update section 74 receives magnitude and angle of arrival data from compute section 72 and corrects the angle of arrival data with sensor parameters received from receiver 16 through communication interface 70. Cartesian mapping section 76 receives range and corrected angle of arrival data from spherical update section 74 and calculates the memory location associated with that point in the volume as a function of the movement of transducer array 14. Autoregressive grid update section 78 adds the magnitude associated with a sample to the contents of the memory location calculated by Cartesian mapping system 76.

After a statistically significant number of backscatter samples is taken, a histogram of backscatter data begins to emerge. Points in the volume that have consistently reflected acoustic signals have higher numbers in their associated memory locations. This distribution of reflection intensity can then be used to ascertain the nature of the volume insonified. Image processing section 80 processes the backscatter histogram and sends the image generated to system controller 82 where it can be displayed on operator console 86 or stored to nonvolatile memory 84. Also, as transducer array 14 moves through a volume of water the backscatter histogram data associated with the volume already passed through is saved for future reference and processing.

System controller 82 also controls the ping repetition rate, pulse width and amplitude by transferring control commands through communications interface 70 to receiver 16 as stated above.

The preferred embodiment of processor 18 is illustrated in FIG. 3. FIG. 3 shows a VME-based system of four printed circuit cards. Communications interface 70 is a VME-compatible card that communicates with receiver 16 over serial data line 35 and with DSP card 92 over a thirty-two bit parallel backscatter data port 90. DSP card 92 is connected to DSP card 96 over a thirty-two bit parallel backscatter histogram port 94. System controller 82 is connected to communications interface 70, DSP 92 and DSP 96 over VME bus 97. System controller 82 is also connected to nonvolatile memory 84 over a SCSI data line and to an operator interface 86 including a video display 98 and a keyboard 99.

DSP card 92 performs the calculations of compute section 72, spherical update section 74, Cartesian mapping section 76 and autoregressive grid update section 78. DSP card 96 receives updated backscatter histograms over histogram port 94, saves them to memory and converts them to images to be displayed on video display 98 and to be stored in nonvolatile memory 84.

In the preferred embodiment of the present invention DSP cards 92 and 96 are VME-compatible printed circuit boards with two TMS320C30 Digital Signal Processors (DSP) manufactured by Texas Instruments, Dallas, TX. The use of a DSP chip such as the TMS320C30 for digital signal processing is well known in the art. System controller 82 is a VME-compatible 68030 board with integrated SCSI, video and serial data interfaces.

Design aspects of the components of volumetric scanning system 10 will be discussed next. In the preferred embodiment of the present invention transducer array 14, transmitter 12 and receiver 16 are standard sonar components. The use of transmitters, receivers and transducer arrays in active sonar applications is well known in the art and will not be described in detail. However there are some aspects of the current system that bear examination.

The geometry chosen for transducer array 14 is a function of the characteristics of the acoustic beam desired. The characteristics of the beam depend in large part on the dimensions of acoustic array and the separation of the acoustic centers. Acoustic centers are formed either by individual transducer elements or by summing together groups of elements. How this is done depends on the operating frequency and the solid angle of coverage desired.

Acoustic centers are formed either by individual transducer elements 20 or by summing together groups of elements 20. How this is done depends on the operating frequency and the solid angle of coverage that is desired.

The separation between acoustic centers must be less than one-half of a wavelength at the operating frequency, if hemispherical coverage (up to 90 degrees away from normal to the plane of the array in any direction) is desired. This ensures that only one offset angle can produce a given electrical phase difference between sensors. If the spacing is greater than one-half wavelength, then as the offset angle increases and the electrical phase difference increases, eventually an angle is reached where the electrical phase difference exceeds 180 degrees and an ambiguity is introduced (e.g., +181 degrees is indistinguishable from −179 degrees). One can get away with violating this one-half wavelength rule if the beampattern of the elements or element groups is constrained (narrowed beam) such that it is sufficiently insensitive in the direction of ambiguity. The system can then correctly assume that true direction is within the limits of mechanical offset angle which correspond to ±180 degrees electrical.

Figure 4A:
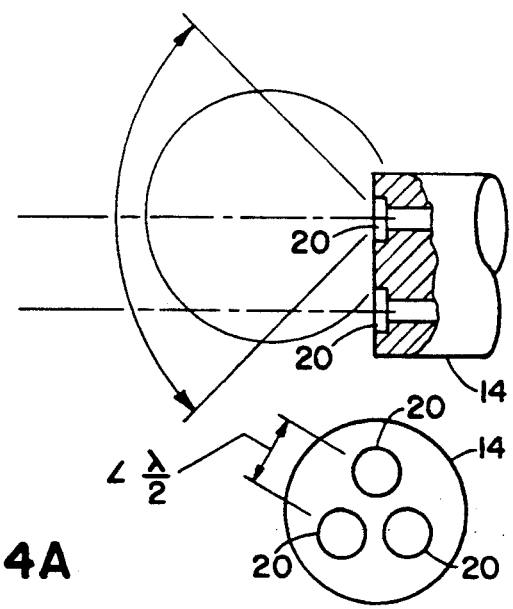
FIGS. 4a-4c show graphical representations of transducer arrays compatible with the present invention.
Figure 4B:
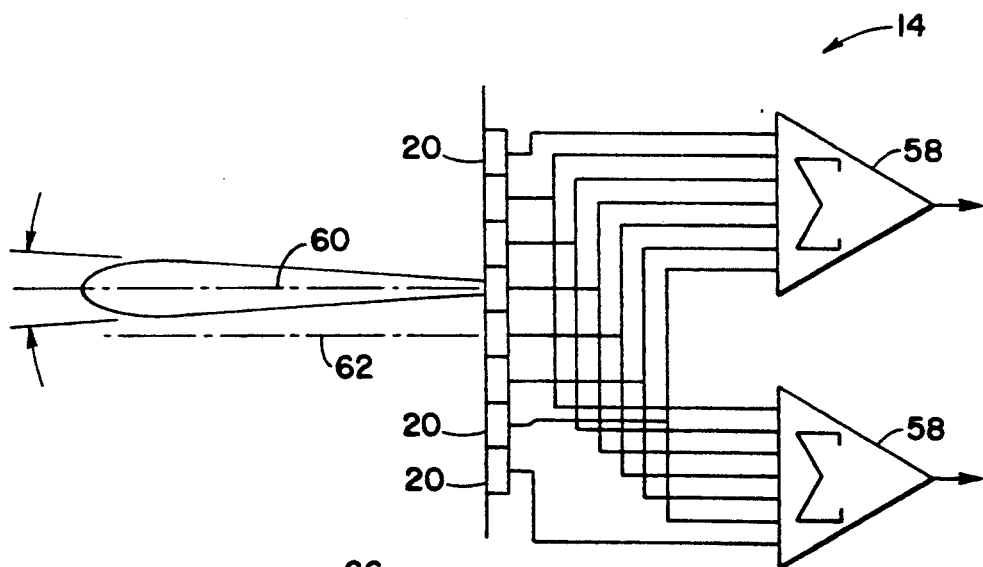
Figure 4C:
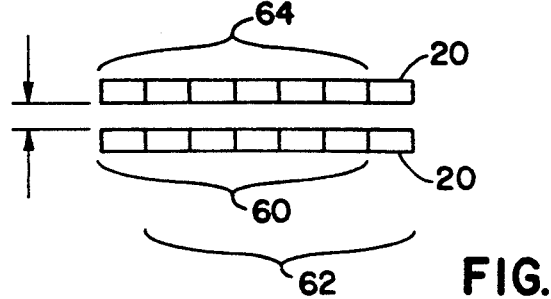

FIGS. 4a–4c provide examples of how acoustic centers are formed. In FIG. 4a the acoustic centers are formed by individual elements 20 with individual beampatterns that approach hemispherical coverage. This is part of an obstacle avoidance sonar system which provides approximately 90 degrees of coverage over a large conical region. Therefore, the element separations are less than one-half wavelength.

FIG. 4b is an example of a transducer array 14 in which many individual horizontally displaced transducer elements 20 are summed together using analog summers 58 to form a very narrow horizontal beampattern of approximately one degree of coverage centered at each of two acoustic centers 60 and 62. The two horizontally displaced acoustic centers 60 and 62 are placed five wavelengths apart and share many of the same transducer elements 20. The narrowness of the horizontal beams allows the system to assume that all returns are from a direction which is within the beam and not from one of the ambiguous directions.

FIG. 4c is a view facing into an example transducer array 14 in which two of the arrays of transducer elements 20 shown in FIG. 4b are separated by approximately one wavelength in the vertical direction. Since the vertical aperture (dimension of the face) is that of a single element, the vertical beampattern is fairly wide. Hence, the separation of the vertically displaced centers is correspondingly less. Again, the separation of the acoustic centers and the beampatterns are coordinated to discriminate against ambiguities.

In the preferred embodiment, transducer elements 20 are longitudinal vibrators. Due to their cost and complexity, longitudinal vibrators are used in applications where the number of elements is low. However, in this application, the cost and complexity are offset by their added efficiency.

In an alternate embodiment of the present invention, transducer array 14 is an array of four longitudinal vibrators arranged in a square configuration with the sides of the square in the horizontal and vertical planes.

In yet another embodiment, transducer array 14 is an array of M×N longitudinal vibrators arranged in a matrix with the sides of the matrix in the horizontal and vertical planes. In this case the vibrators can be treated as separate elements 20 or summed as described above to form a smaller subset of acoustic centers. This is a tradeoff of accuracy against processing complexity and expense.

Figure 5:
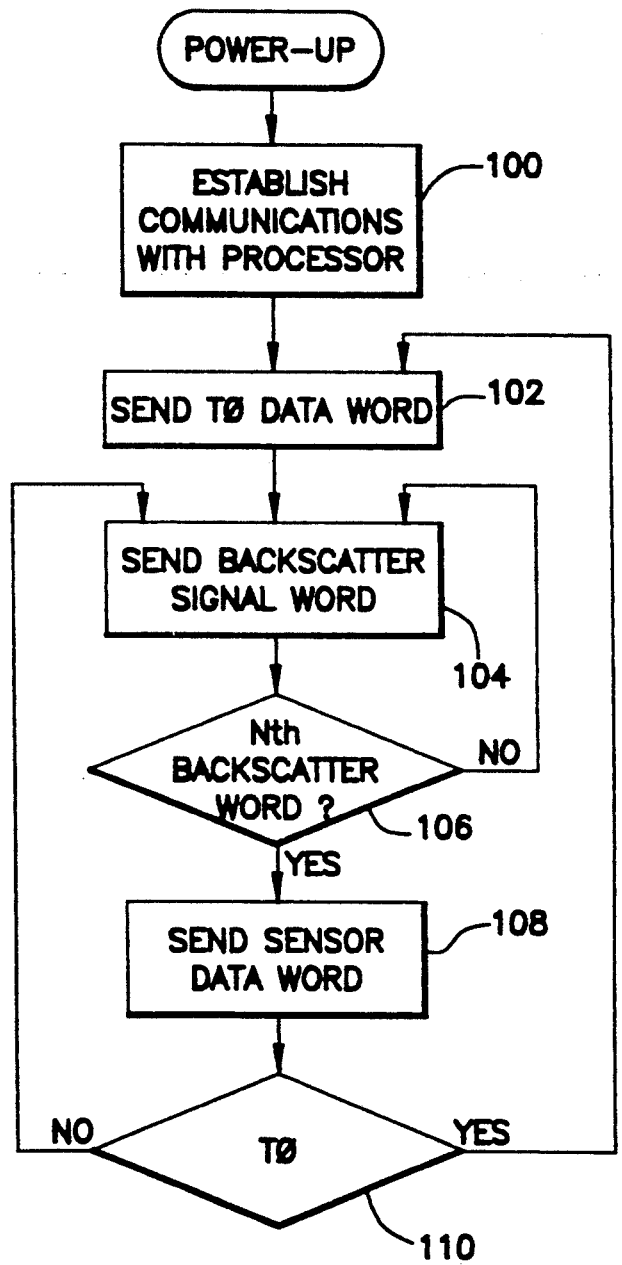
FIG. 5 is a flow chart representative of typical steps taken in a receiver during acquisition of backscatter signals.

The preferred operation of receiver 16 is shown in FIG. 5. In the preferred embodiment, receiver 16 is connected to processor 18 by serial data line 35. As is typical in many side-scanning sonar applications, frequency division multiplexing is used to provide full-duplex communications between receiver 16 and processor 18 using different carrier frequencies over a single data line. To accomplish this, data to be transmitted from receiver 16 to processor 18 is Manchester encoded to combine clock and data. The resulting signal is used to frequency modulate a carrier for transmission to processor 18. On the other hand, due to the low data rate, commands sent from processor 18 to receiver 16, commands are sent at a relatively low rate using frequency shift keying.

As shown in FIG. 5, communications interface 40, on receiving power, begins at 100 to set up communication with processor 18. It then begins to send to processor 18 a regular stream of backscatter and other sensor data. At 102, a data word associated with the T0 signal is sent to processor 18. At 104, a word associated with sampled backscatter signal is sent to receiver 18. At 106, a check is made to see if the Nth backscatter signal word has been sent. If not, control moves to 104 and another backscatter signal word is sent. If so, at 108, a sensor data word containing parameters such as pitch and roll is transmitted. In the preferred embodiment, ten backscatter words are followed by one sensor data word.

At 110, a check is made to see if a T0 signal has been detected. If so, control moves to 102 where a new T0 signal word is sent. If not, control moves to 104 and a new sequence of backscatter and sensor words is transmitted.

In the preferred embodiment, transmitter 12, transducer array 14 and receiver 18 are designed to operate with 35 Khz acoustic signals. In that embodiment, low pass filter 34 is designed to have a corner frequency of 70 Khz and sample and hold circuit 36 and A/D circuit 38 are designed to sample the backscatter signals at 280 Khz. The resulting sampled backscatter data is sent to processor 18 for signal processing and histogram creation.

Figure 6B:
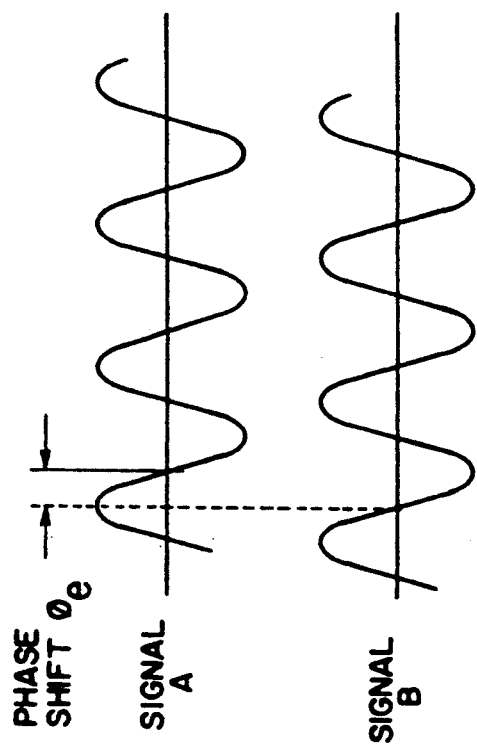
FIG. 6b is a typical graphical representation of the phase shift in a backscatter signal between its arrival at one element and its arrival at an adjacent element.
Figure 6A:
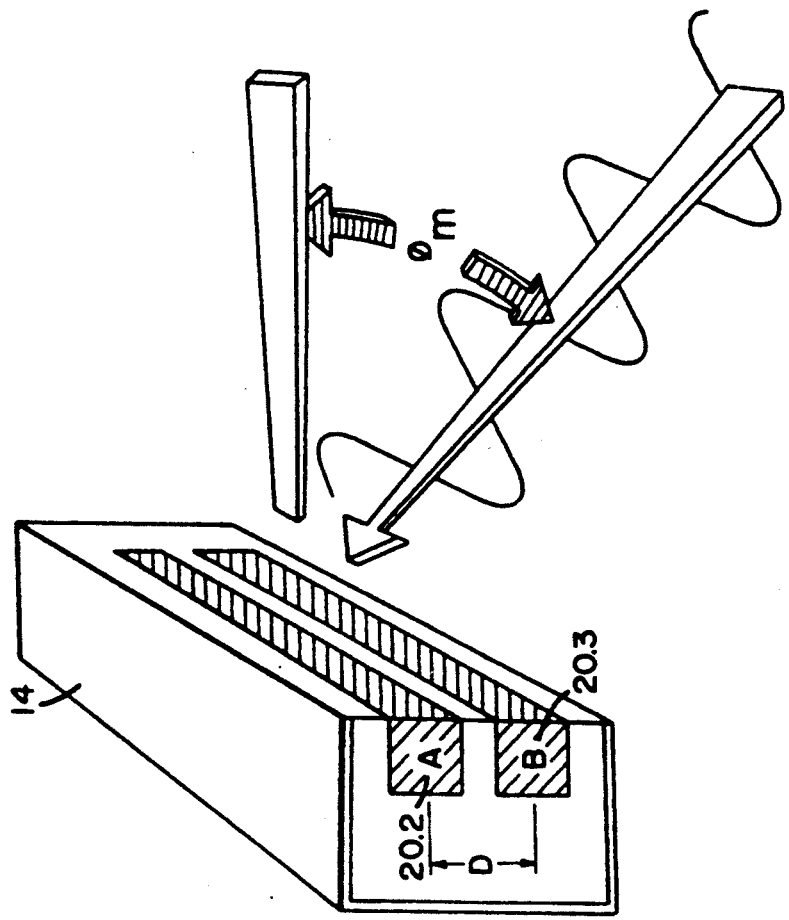
FIG. 6a is a typical graphical representation of a backscatter signal arriving at two of the elements of a receiver array.

Formation of a typical backscatter histogram will be discussed next. The first step toward formation of the backscatter histogram typically is the calculation of the angle of arrival of the sampled backscatter signal. Angle of arrival is measured from boresight, where boresight typically is a line normal to the plane of the face of transducer array 14. The use of differential phase measurements to measure the angle of arrival of a backscatter signal is illustrated in two dimensions in FIG. 6a. FIG. 6a shows a backscatter signal arriving at elements 20.1 and 20.2 of a transducer array 14. A signal arriving at elements 20.1 and 20.2 from an angle different from boresight will undergo some phase shift as it travels the extra distance to the more remote element 20.2. This phase shift is illustrated in FIG. 6b where a phase shift is shown between the electrical signal generated by element 20.1 and the electrical signal generated by element 20.2. The angle of arrival of the backscatter signal can be calculated as:

$$\text{Sin (angle of arrival)} = \frac{C}{F \cdot D} \times \frac{\text{phase shift angle}}{360 \text{ degrees}}$$

where

C=Acoustic velocity
D=Element spacing
and
F=Signal frequency

The phase shift angle is calculated by translating the band-limited backscatter data into its In-Phase (I) and Quadrature (Q) components. These components are then converted to magnitude and phase using the following equations:

$$\text{Magnitude} = \text{Squareroot}(I^2 + Q^2)$$

$$\text{Phase} = \tan^{-1}(Q/I)$$

This conversion is performed separately on data from each of receiver channels 27. The magnitudes for each of the channels 27 are then summed and stored for later use. The computed phase angles are subtracted to form the phase shift above. In the above case, phase associated with 20.2 is subtracted from phase associated with 20.1.

In the preferred embodiment, the three elements 20.1 through 20.3 are used to calculate the angle of arrival in three-dimensions as an azimuth and an elevation angle. The azimuth angle is calculated as above with the phase shift angle calculated by detecting the phase shift between element 20.2 and 20.3. The elevation angle is calculated by summing elements 20.2 and 20.3 to form an acoustic center directly beneath 20.1. Then the phase shift is calculated as above. These operations are performed in compute section 72.

In an alternate embodiment, range to a target, angle of arrival and magnitude can be determined through analog circuitry in a manner known in the art.

FIG. 7 illustrates a typical spherical coordinate system that results from the above calculations. It can be seen that range is very important in defining the resolution of volumetric scanning system 10. The path of the acoustic signal can be viewed as a wave passing through a series of overlapping spherical shells 120. If a large number of samples is taken as the wave passes through each infinitely thin shell, the resulting histogram will provide the highest resolution image. This can be approximated in a real world system by keeping the ping pulse width small or through impulse equivalent correlation functions using high time/bandwidth product signals such as chirps.

The azimuth and elevation angles calculated from the backscatter signals are next corrected in spherical update section 74 to approximate an angle of arrival measured on an infinitely stable transducer array platform.

Figure 8:
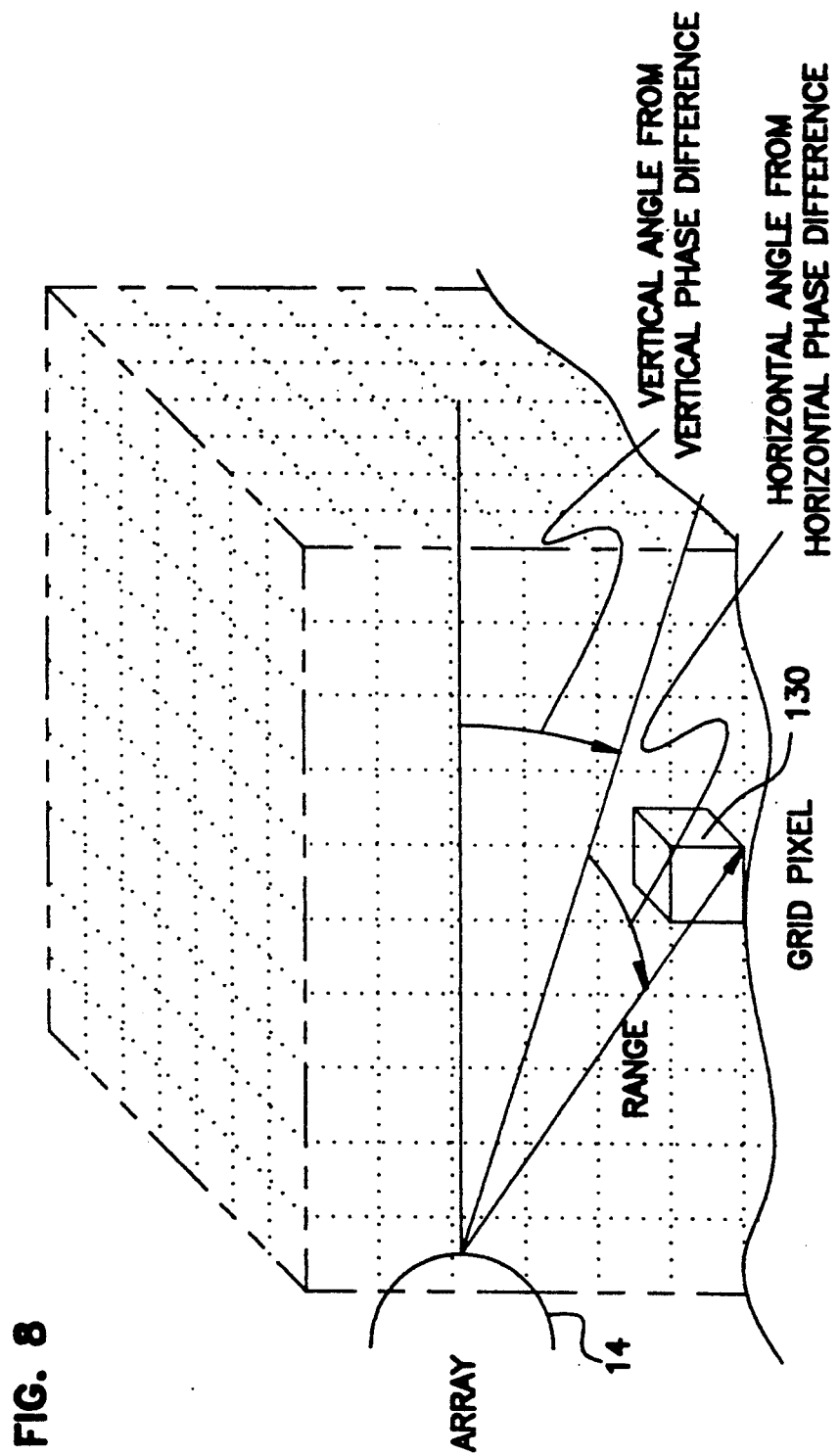
FIG. 8 is a typical graphical representation of a coordinate system used to placed backscatter signals into a backscatter histogram.

The corrected angle of azimuth and elevation angles are then combined with the range and converted to Cartesian coordinates in Cartesian mapping section 76. The result is used to address a table of gridded histogram pixels as shown in FIG. 8. Backscatter signals that are traced to any point in grid pixel 130 are assumed to come from the center of pixel 130. However since the determination of a point in the volume from the differential phase shifts as calculated above provides spacial resolution much higher than the beam widths used to insonify the point, that assumption has negligible effects.

Figure 9:
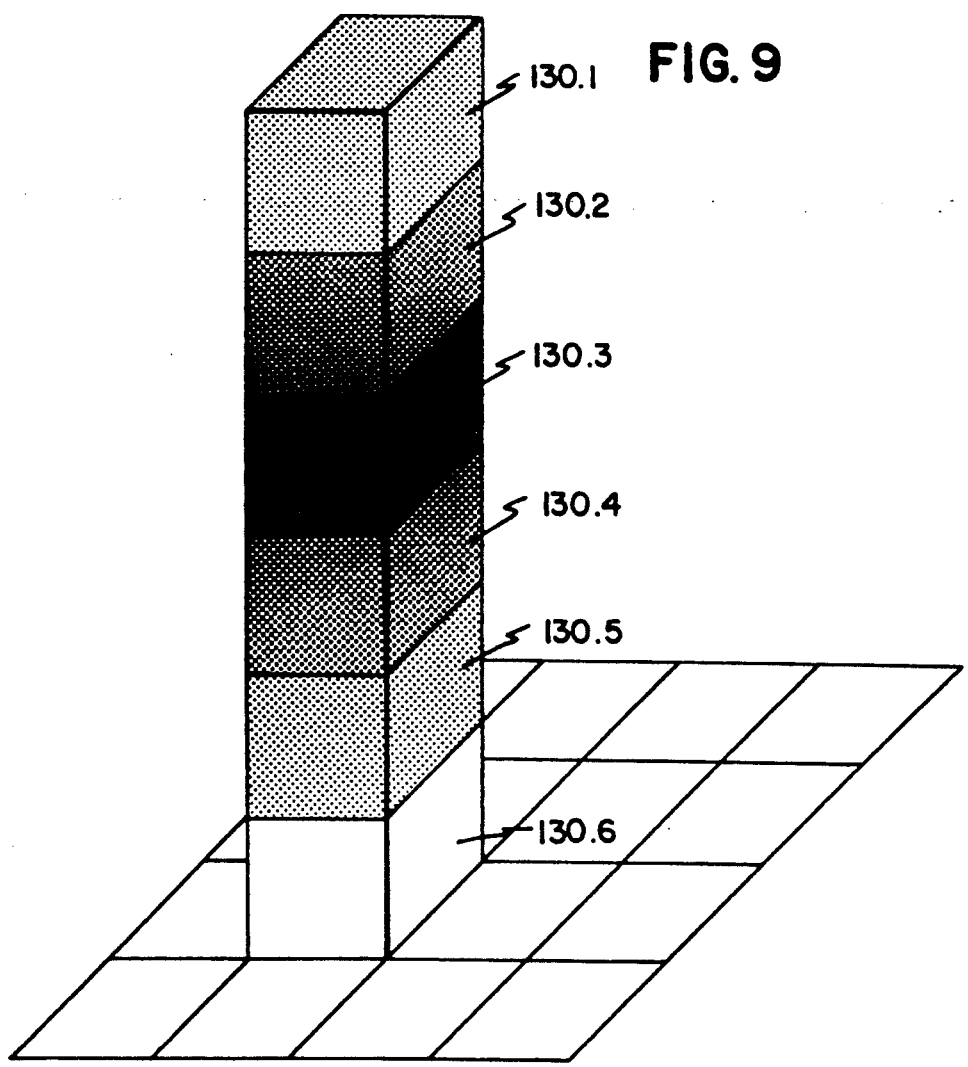
FIG. 9 is a typical graphical representation of a distribution of backscatter returns in a column of pixels.

Once a backscatter sample has been detected as originating from grid pixel 130, its effect must be noted in the backscatter histogram. A distribution of backscatter signals originating from grid pixels 130 is shown in FIG. 9. FIG. 9 shows grid pixels 130.1 through 130.6. The distribution of backscatter signals is illustrated by shading with grid pixel 130.3 being the source of the largest number of backscatter returns. In a terrain mapping system grid pixel 130.3 would have the highest probability of being the bottom of the ocean floor. One method of building a histogram of backscatter events is to note each event by incrementing the contents of a memory location associated with its grid pixel 130. A more effective approach, and the preferred embodiment, is to add the magnitude calculated by compute section 72 to that memory location. The result is a histogram weighted with backscatter signal intensity. This function is performed by autoregressive grid update section 78.

To prevent intensity from building without limit a decay algorithm is applied by grid update section 78 to the contents of the memory locations associated with the backscatter histogram. The decay algorithm is the process for averaging the history of data that falls in each grid pixel 130. A separate averaging process is performed on each pixel 130. The data from different pixels is never mixed together during this process. The process preferably applies the greatest weight to the most recent input. The preferred difference equation that defines the process is as follows:

$$Df(n) = (1-A) \times Df(n-1) + A \times Du(n),$$

where $Df(n)$ = nth (latest) sample of filtered data, $Df(n-1)$ = (n−1)th (previous) sample of filtered data, $Du(n)$ = (latest) sample of unfiltered input data to the pixel, A = weighting coefficient assigned to the new unfiltered input data (O < A < 1).

A new $Df(n)$ is typically computed after each ping. If no nonzero data falls within the pixel during a ping cycle, then $Du(n) = 0$, and the $Df(n)$ begins to fade. If many consecutive pings occur for which $Du(n) = 0$, then $Df(n)$ will asymptotically approach zero. Conversely, if many consecutive pings occur for which $Du(n) = L$ (some arbitrary level), then $Df(n)$ will asymptotically approach L. In the preferred embodiment the value of A is in the range of 0.1 to 0.3.

In the preferred embodiment, the current backscatter histogram is kept in local memory on DSP card 92. As transducer array 14 moves through the volume that it has insonified, grid pixels 130 from the volume behind array 14 are stored to nonvolatile memory 84. The memory locations associated with those grid pixels 130 then become available to be used as new grid pixels 130 ahead of transducer array 14.

An image processing application in which the present volumetric scanning technique is applied to terrain mapping is described next. Image processing is performed by image processing section 80. In the preferred embodiment these calculations are performed on DSP card 96. Histogram data is pulled from DSP card 92 when needed and a series of calculations are made. The resulting image is transferred to system controller 82 where it is available for display or storage at the operator's discretion.

The pixel grid is made up of numerous columns of three-dimensional grid pixels 130 in which magnitude sums accumulate in proportion to the level of received signals from the volume associated with that pixel 130. The sums are continuously replenished via the constant sampling process. The sums are decayed per the decay algorithm described above. The objective of the terrain mapping algorithm is to recognize the correct terrain level indication when presented with a single column of volume pixels and to reject inconclusive data. The magnitude sums of a column of pixels 130 in the backscatter histogram are represented at any given instant in time, top to bottom, by a series of discrete whole numbers that is called series A. The length of series A is N. In the preferred embodiment, a number of tests is conducted on each discrete column series:

Test 1. Monotonic Peak: If the value of the numbers in series A monotonically decreases on either side of the single highest number in the series then the volume pixel represented by the single highest pixel is designated as the terrain level. If this condition does not exist, then the undisturbed series A is subjected to the next test.

Test 2. Scaled Running Average Monotonic Peak: K is the greatest odd number that is less than or equal to (0.5)N. A new series B is formed by performing a running average using K numbers to form each average sum. Therefore the first number in the new series B will be the average of the first K numbers in series A. The second number will be the average of the numbers in positions 2 through K+1 of series A, etc. The last number will be the average of the last K numbers in series A. The new series B will have K−1 numbers fewer than in the A series. This is not convenient since each number in the series coincides with a specific volume pixel 130 in the column. To correct this situation, processing section 80 adds (K−1)/2 zeros to each end of series B. This provides a one to one correspondence between the numbers in series A and the numbers in series B. Image processing section 80 then returns to the monotonic peak test explained in Test 1 above to determine the terrain level. If a monotonic condition does not exist, then the column data is rejected as inconclusive and processing section 80 moves to the next column for continued processing.

The terrain can now be determined by examining the matrix of values, each of which represent the positions of the monotonic peaks in each column in the volumetric grid. Empty grid positions (due to inconclusive columnar data) are filled with values interpolated between the two nearest neighbors.

The terrain mapping algorithm output typically is a matrix of values that represent the terrain altitude above the theoretical grid floor over the area of interest. In addition, a terrain confidence level normally is output, the value of which is the ratio of the number of columns which contain valid terrain levels (prior to interpolation) to the total number of columns in the grid.

Figure 10:
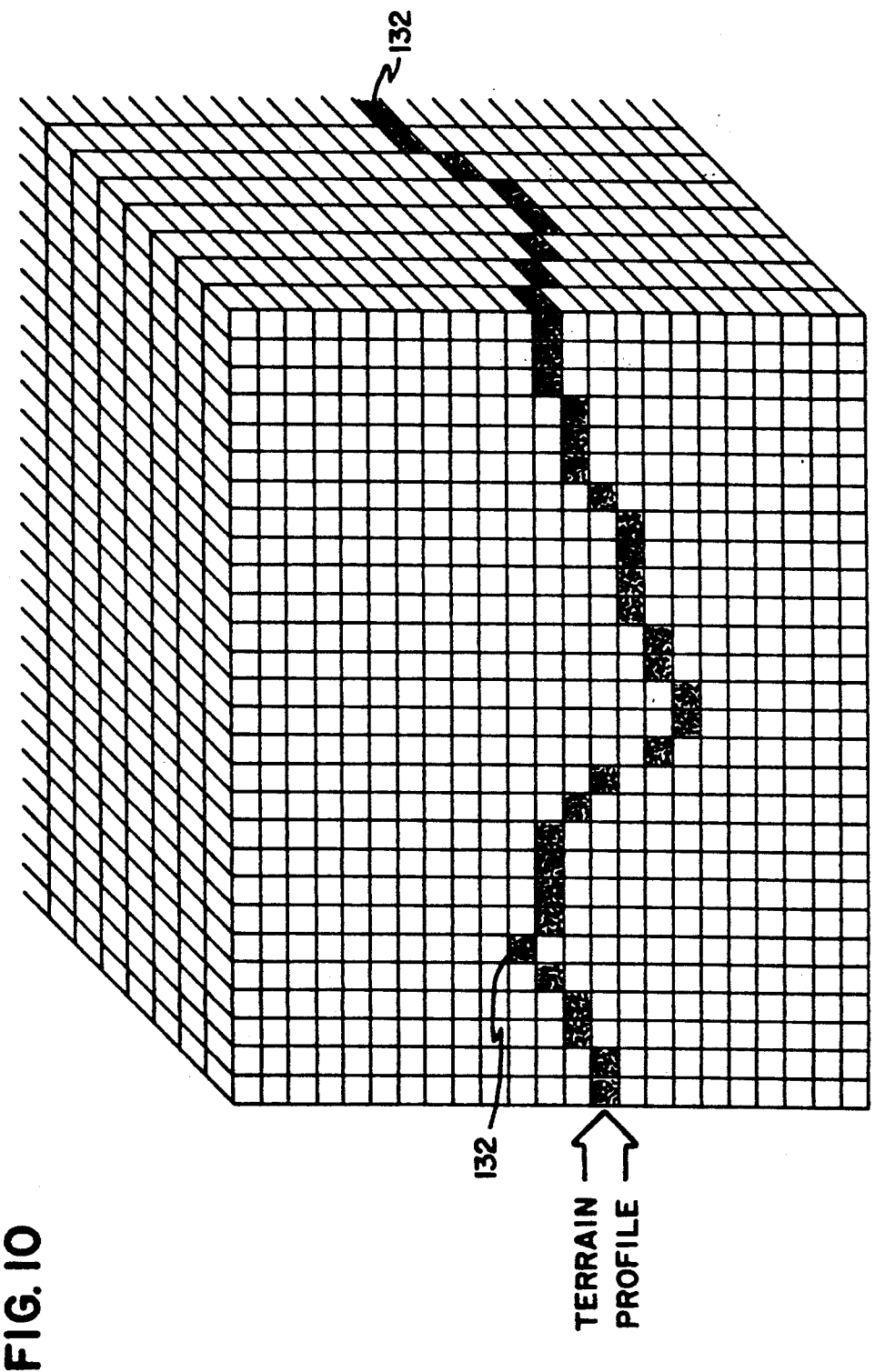
FIG. 10 is a typical graphical representation of a volumetric area showing the pixels designated as the floor of a body of water as determined from a process of converting backscatter statistics into a terrain map.

A representative terrain map calculated by image processing section 80 is shown in FIG. 10. FIG. 10 is a graphical representation of the volumetric area showing the terrain level pixels 132 as determined from the process of converting backscatter statistics into a terrain map described above. The resulting terrain map may be used to guide autonomous vehicles or as an aid in determining vehicle location.

In an alternate embodiment, smoothing or averaging algorithms are implemented on the pixels 130 which make up the backscatter histogram prior to the implementation of the terrain mapping algorithm. The smoothing algorithms consist of "nearest neighbor volumetric averaging" where, for example, the new value of a magnitude sum becomes the average of its nearest six (sides only) or twenty-six (sides and corners) surrounding neighbors.

Alternate embodiments to the volumetric scanning system will be described next. An alternate embodiment of transmitter 12, array 14 and receiver 16 is shown in FIG. 3. In this embodiment, nine transducer elements 50 are arranged in a 3×3 matrix configuration. Elements 50.1, 50.2, 50.4 and 50.5 are connected to form a first acoustic center 52.1, elements 50.2, 50.3, 50.5 and 50.6 are connected to form a second acoustic center 52.2, elements 50.4, 50.5, 50.7 and 50.8 are connected to form a third acoustic center 52.3 and elements 50.5, 50.6, 50.8 and 50.9 are connected to form a fourth acoustic center 52.4. Four receiver channels 27 are provided for converting backscatter signals to digital representations before passing them on to processor 18.

In this embodiment, elements 50 are ceramic elements that operate by piezoelectric principles. This allows the construction of compact transducer arrays with multiple elements.

Figure 11:
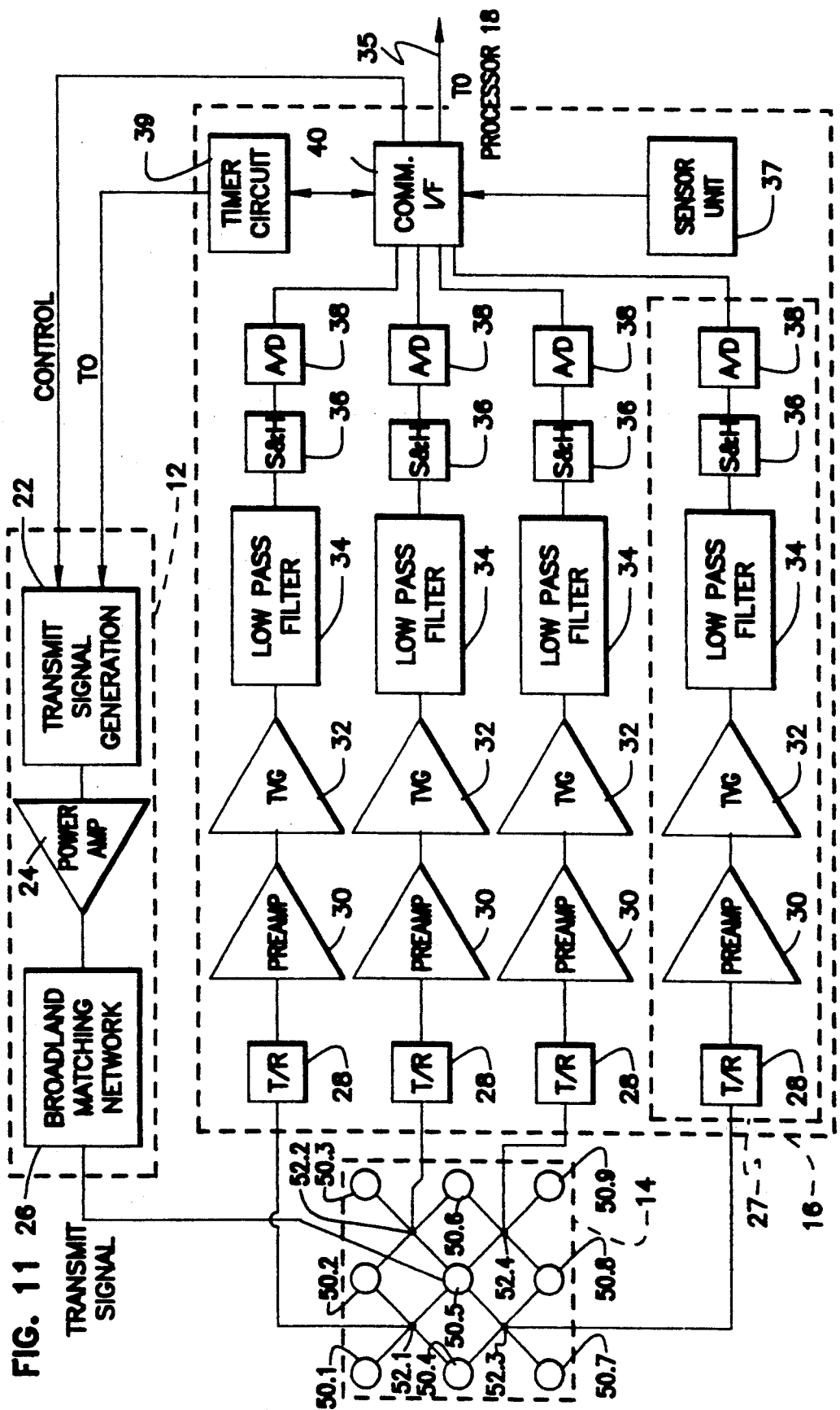
FIG. 11 shows a functional block diagram of an alternate embodiment of a transducer array and receiver compatible with the present invention.

The four acoustic centers 52.1 through 52.4 of the transducer array 14 of FIG. 11 provide an overdetermined system. This is because any three of the acoustic centers 52 can be used to calculate angle of arrival. Therefore it is possible to come up with four candidate angles of arrival. A compromise solution can be obtained by applying a least squares algorithm to approximate the angle of arrival. Such a system should perform more capably in the presence of noise than a three acoustic center transducer array. However, it is more complex.

Figure 12:
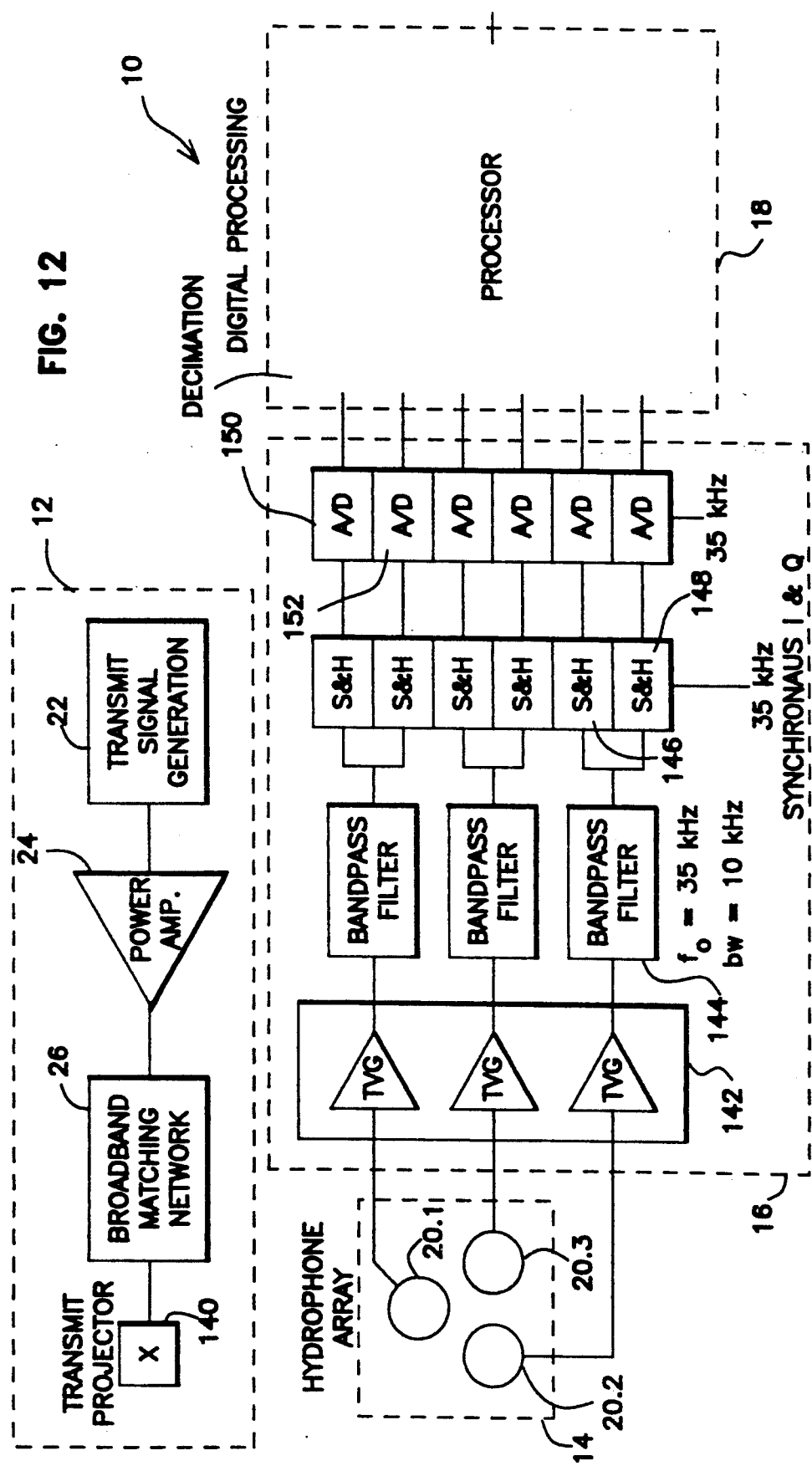
FIG. 12 shows a functional block diagram of an alternate embodiment of a transmitter, transducer array and receiver compatible with the present invention.

Another alternate embodiment of the present invention is illustrated in FIG. 12. In this embodiment, a projector 140 has been added to transmitter 12 for independent transmission of acoustic signals. Input circuit 142 contains protection circuit 28, preamp 30 and time varying gain amplifier 32. Low pass filter 34 of the preferred embodiment is replaced with a 16 Khz bandpass filter 144 centered at 35 Khz. Sample and hold circuit 36 is replaced by two sample and hold circuits 146 and 148. Sample and hold circuits 146 and 148 are sampled 90 degrees out of phase at 35 Khz to provide analog I and Q signals. A/D circuit 38 is replaced with A/D circuits 150 and 152 which convert the I and Q for each channel to digital at the same 35 Khz rate. In this embodiment, processor 18 does not need to perform the complex demodulation function since it is done in the analog domain as an inherent part of the synchronous sampling process.

The approach of FIG. 12 reduces the processing requirements on processor 18 while increasing the complexity of the sampling process.

Figure 13:
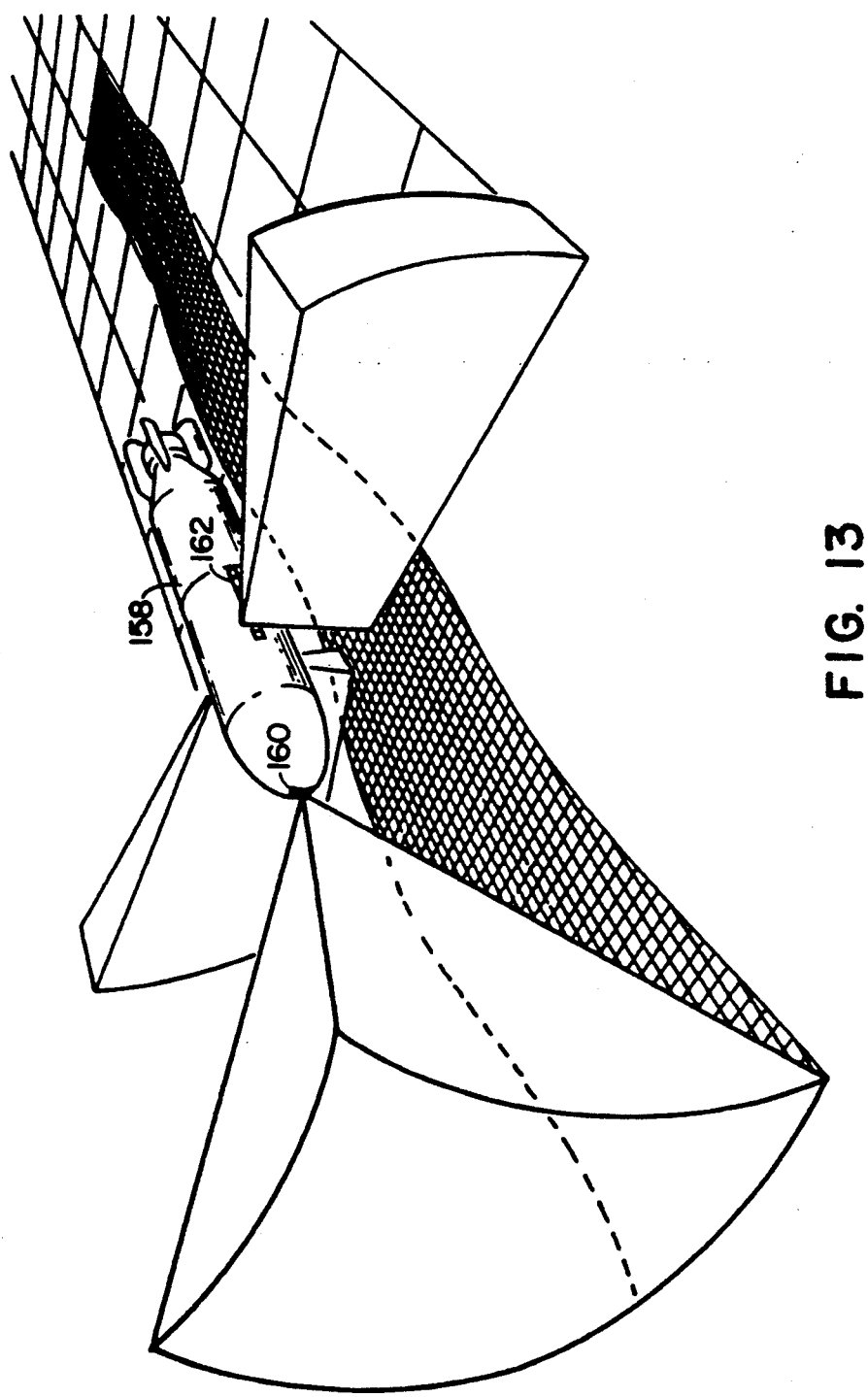
FIG. 13 illustrates a preferred volumetric imaging sonar system comprising a plurality of volumetric scanning sonar systems.

The use of more than one volumetric scanning system 10 will be discussed next. FIG. 13 illustrates a volumetric imaging sonar system 158 comprising a plurality of volumetric scanning sonar systems. A forward looking volumetric scanner 160 insonifies a volume ahead of it with a conical beam of fairly wide degree. Two side looking scanners 162 insonify with a narrower, longer range beam. A large backscatter hologram is drawn over a volume surrounding system 158.

In the preferred embodiment of a multiple scanner imaging system, a processor receives backscatter data such as magnitude and angle of arrival from the receivers of scanners 160 and 162 as described in the single receiver system of FIGS. 2a and 2b. The processor forms a backscatter histogram by applying data received from each of the receivers to a single backscatter histogram. Ambiguities are resolved through application of optimization techniques for overdetermined systems such as least squares fit.

In this embodiment, resolution of ambiguities in backscatter data can be used to increase resolution in those sections of the volume that the systems overlap. This can be done through application of optimization techniques for overdetermined systems such as least squares fit.

Figure 14:
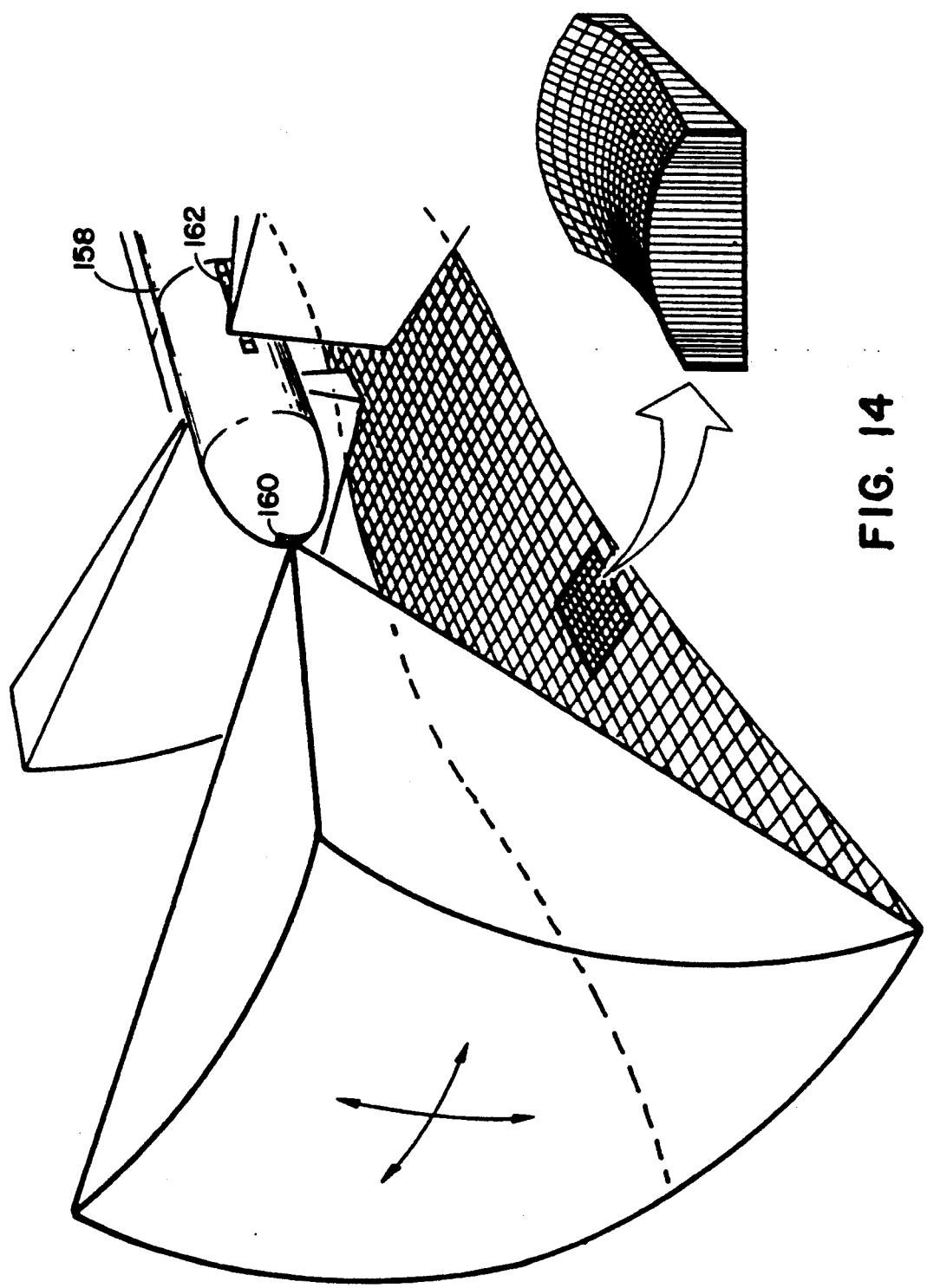
FIG. 14 illustrates the volumetric scanning sonar system used for forward looking volume imaging in the system of FIG. 13.
Figure 15:
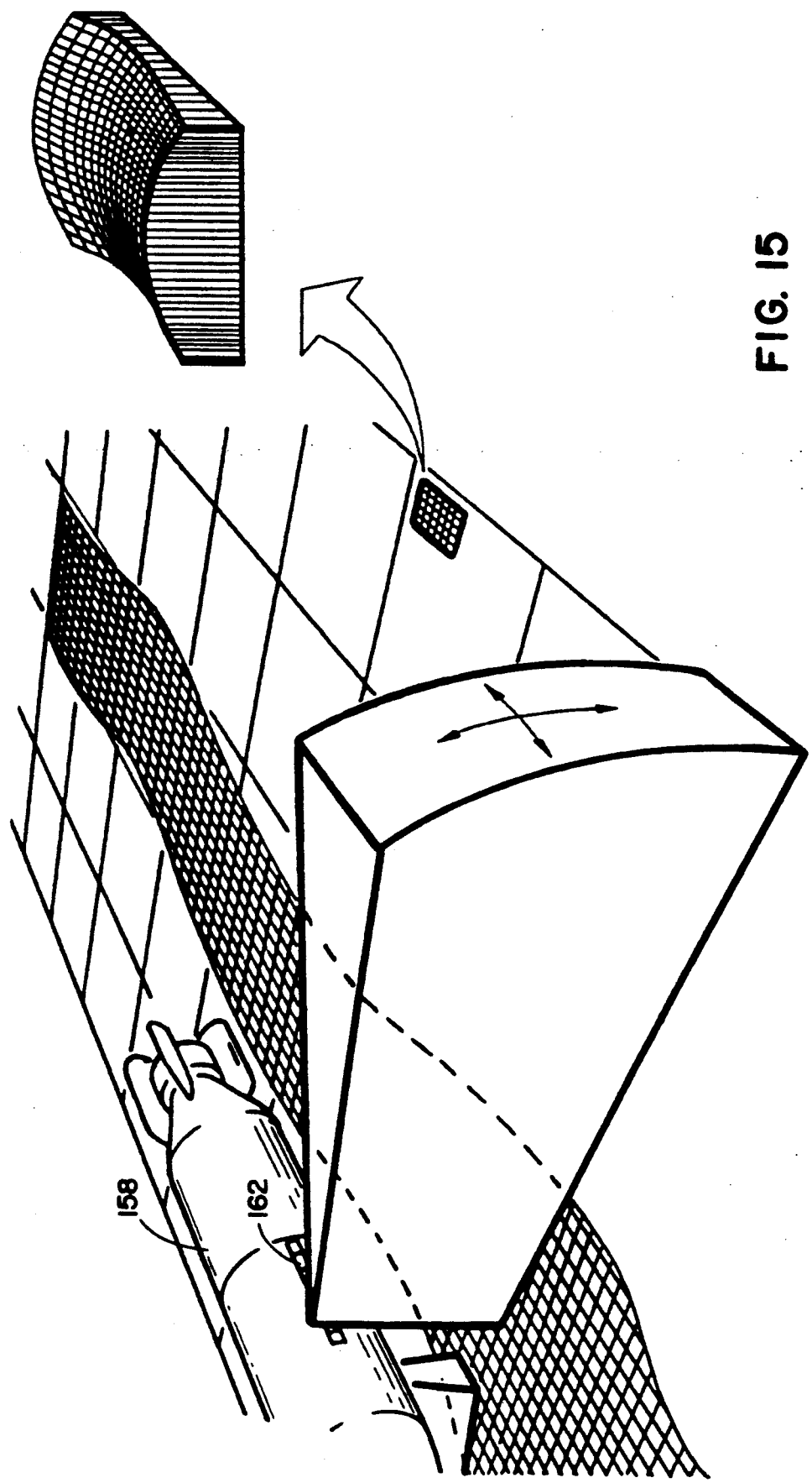
FIG. 15 illustrates one of the volumetric scanning sonar system used for side looking volume imaging in the system of FIG. 13.

FIGS. 14 and 15 illustrate the scanning possible with volumetric scanning sonar system 158. FIG. 14 shows the terrain mapping possible with forward looking sonar 160. FIG. 15 shows the terrain mapping possible with one of the side looking sonars 162. Beam width and beam overlap of beams generated by sonar 160 and sonars 162 can be chosen to increase resolution by increase overlap or to increase range by narrowing the beam to insonify at a greater range.

In an alternate embodiment of the system of FIG. 13, a three-dimensional model of the volumetric area is formed by each of the scanners 160 and 162. These models are then merged to create a single three-dimensional model of the volume surrounding the sonar vehicle.

In another alternate embodiment of the system of FIG. 13, better resolution and such things as identification of terrain materials is possible if scanner 160 operates at a frequency that is different than that of systems 162.

The foregoing description of the preferred embodiments of the present invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A sonar system for imaging a volumetric area, comprising:
   transmission means for insonifying the volumetric area with acoustic signals;
   a receiver array including at least three elements for receiving a plurality of backscatter acoustic signals reflected from structures within the volumetric area and for generating electrical signals corresponding to the reflected backscatter signals, the elements being distributed within a receiver plane parallel to the face of the receiver array such that at least two elements are separated in a horizontal direction and at least two elements are separated in a vertical direction;
   means for generating timing data indicative of the time delay between transmission of an acoustic signal from the transmission means and reception of reflected backscatter signals associated with the acoustic signal at the receiver means;
   means for generating magnitude data as a function of the amplitude of the reflected backscatter signals; and
   processor means for refining the reflected backscatter signals, the processor means including:
      means for generating vertical angle data as a function of vertical differential phase measurements of the electrical signals corresponding to the reflected backscatter signals received by the vertically displaced elements, the vertical angle data being indicative of the vertical angle between the backscatter signals and a vertical reference plane oriented normal to the receiver plane;
      means for generating horizontal angle data as a function of horizontal differential phase measurements of the electrical signals corresponding to the reflected backscatter signals received by the horizontally displaced elements, the horizontal angle data being indicative of the horizontal angle between the backscatter signals and a horizontal reference plane oriented normal to the receiver plane; and
      means for steering the magnitude data for each of the plurality of backscatter signals to a particular pixel within the insonified volumetric area as a function of the timing data, the vertical angle data, and the horizontal angle data associated with each backscatter signal so that a three-dimensional histogram of backscatter magnitudes as a function of location is formed.

2. The sonar system according to claim 1 wherein the processor means further includes means for interpreting the three-dimensional histogram of backscatter magnitudes so that a map of the volumetric area is formed.

3. The sonar system according to claim 1 wherein the number of elements in the receiver array is three and the three elements of the receiver array are positioned with two of the elements in the horizontal reference plane and two of the elements in the vertical reference plane.

4. The sonar system according to claim 1 wherein the number of elements in the receiver array is three and the three elements of the receiver array are positioned at equal distances from each other.

5. The sonar system according to claim 1 wherein the number of elements in the receiver array is at least four and wherein the processing means further includes means for removing uncertainties in determining angle of arrival of the reflected backscatter signals.

6. The sonar system according to claim 1 wherein the transmission means includes transmission beamforming means for generating narrow beams such that only one portion of the volumetric area is insonified at a time and wherein the receiver means includes receiver beamforming means coupled to the transmission beamforming means such that the receiver means will process only backscatter data received from that particular portion of the volumetric area.

7. A sonar system for imaging a volumetric area, comprising:
   transmission means for insonifying the volumetric area with acoustic signals;
   receiver means including a plurality of elements for receiving a backscatter acoustic signal reflected from a structure within the volumetric area and for generating an electrical signal corresponding to the backscatter signal, the elements being arranged such that at least two of the elements are separated in a first direction relative to boresight for the receiver means and at least two elements are separated in a second direction relative to boresight;
   means for generating timing data indicative of the time delay between transmission of an acoustic signal from the transmission means and reception of the reflected backscatter signal at the receiver means; and processor means for refining the reflected backscatter signal, the processor means including:

means for generating first angle data as a function of a differential phase measurement of the electrical signal corresponding to the backscatter signal received by the two elements separated in the first direction, the first angle data being indicative of the angle between the angle of arrival of the backscatter signal and a first reference plane oriented transversely to the elements displaced in the first direction; and means for generating second angle data as a function of a differential phase measurement of the electrical signals corresponding to the backscatter signal received by the two elements separated in the second direction, the second angle data being indicative of the angle between the angle of arrival of the backscatter signal and a second reference plane oriented transversely to the elements displaced in the second direction.

8. The sonar system according to claim 7 wherein the transmission means includes transmission beamforming means for generating narrow beams such that only one portion of the volumetric area is insonified at a time and wherein the receiver means includes receiver beamforming means coupled to the transmission beamforming means such that the receiver means will process only backscatter data from that particular portion of the volumetric area.

9. The sonar system according to claim 7 wherein the processor means further includes means for generating magnitude data as a function of amplitude of the reflected backscatter signal.

10. The sonar system according to claim 7 wherein the processor means further includes pixel locating means for determining location of a pixel as a function of the timing data, the first angle and the second angle associated with the reflected backscatter signal, the pixel being representative of a point associated with the structure within the volumetric area.

11. The sonar system according to claim 10 wherein the processor means further includes means for generating magnitude data as a function of amplitude of the reflected backscatter signal and pixel adjusting means for calculating an adjustment to the pixel as a function of the magnitude data.

12. The sonar system according to claim 7 wherein all elements in the receiver are in the same plane.

13. The sonar system according to claim 12 wherein the first reference plane is normal to the plane of the receiver elements and the second reference plane is normal to both the plane of the receiver elements and the first reference plane.

14. The sonar system according to claim 12 wherein the plurality of elements includes three elements, with two of the elements displaced vertically from each other and two of the elements displaced horizontally from each other.

15. The sonar system according to claim 12 wherein the plurality of elements includes three elements placed at the corners of a triangle.

16. The sonar system according to claim 12 wherein the plurality of elements includes four elements placed in a 2×2 grid.

17. The sonar system according to claim 12 wherein the plurality of elements is arranged in an N×M matrix and connected to produce four acoustic centers.

18. The sonar system according to claim 7 wherein the number of elements in the receiver array is at least four and wherein the processing means further includes means for removing uncertainties in determining angle of arrival of the reflected backscatter signals.

19. A terrain mapping sonar system for imaging a volumetric area, comprising:

first and second volumetric scanning systems, wherein each scanning system includes:
transmission means for insonifying a volumetric area with acoustic signals;
receiver means including a plurality of elements for receiving a backscatter acoustic signal reflected from a structure within the volumetric area and for generating an electrical signal corresponding to the reflected backscatter signal; and
backscatter processing means including:
means for generating timing data indicative of the time delay between transmission of an acoustic signal from the transmission means and reception of its associated reflected backscatter signal at the receiver means;
directional means for determining, through differential phase measurements, a first and a second angle defining the angle of arrival of the backscatter signal; and
range determining means for calculating range to the structure; and system processor means connected to the first and second volumetric scanning systems for processing information received from the scanning systems and processing that information to form a three-dimensional model of the volumetric area.

20. The sonar system according to claim 19 wherein each of the backscatter processing means further includes pixel locating means for determining, as a function of range and angle of arrival of each backscatter signal, the location in memory associated with a pixel representation of the point in the volumetric area from which the backscatter signal was reflected.

21. The sonar system according to claim 20 wherein each of the backscatter processing means further includes terrain mapping means for converting a histogram of backscatter signal data into a terrain map.

22. The sonar system according to claim 21 wherein the system processor means includes ambiguity resolution means for resolving ambiguities between a terrain map generated by the first volumetric scanner and a terrain map generated by the second volumetric scanner.

23. The sonar system according to claim 19 wherein the system processor means includes communications interface means for receiving range and angle of arrival data associated with backscatter signals from the first and second volumetric scanning systems and pixel locating means for determining, as a function of range, angle of arrival and scanning system, the location in memory associated with a pixel representation of the point in the volumetric area from which the backscatter signal was reflected.

24. The sonar system according to claim 23 wherein the system processor means further includes terrain mapping means for converting a histogram of backscatter signal data into a terrain map.

25. A method of mapping terrain with a volumetric imaging sonar, comprising:

dividing a volumetric area into a plurality of equal size cubes;

developing a histogram of backscatter data by recording, in a separate memory location associated with each one of the cubes, each time an acoustic backscatter signal is detected coming from the volume bounded by that cube;

determining the cube in each rank and column that has the highest probability of being the terrain floor; and connecting the cubes with the highest probability of being the terrain floor in order to form a terrain map.

26. The method according to claim 25 wherein the step of developing a histogram of backscatter data includes adding a first value to the memory location associated with one of the cubes, the first value being a function of the amplitude of the backscatter signal received from that cube.

27. The method according to claim 25 wherein the step of developing a histogram of backscatter data includes reducing the magnitude of the data stored in each of the memory locations at a predetermined rate so as to increase the influence of more recent backscatter data.

28. The method according to claim 25 wherein the step of determining the cube in each rank and column that has the highest probability of being the terrain floor includes searching the memory locations associated with a rank and column to find the location with the largest magnitude.

29. The method according to claim 25 wherein the step of connecting the cubes includes calculating a confidence level associated with the cube designated as the cube with the highest probability of being the terrain floor to form a terrain map, discarding cubes that do not meet a confidence threshold and fitting a curve to those cubes that do meet the confidence threshold in order to form the terrain map.

30. A method of collecting backscatter data relevant to the formation of a terrain map of a volumetric area, the method comprising:

dividing a volumetric area into a plurality of ranges;

insonifying the volumetric area;

capturing backscatter signals resulting from the insonification of the volumetric area; and determining magnitude, range and angle of arrival of the backscatter signal with the highest amplitude for each particular range.

31. The method according to claim 30 wherein the method of collecting backscatter data further comprises:

dividing the volumetric area into a plurality of equal size cubes;

determining the location of a point cube associated with the angle of arrival of the highest amplitude backscatter signal within each range; and incrementing the contents of a memory location associated with the point cube.

32. The method according to claim 31 wherein the method of collecting backscatter data further comprises multiplying the contents of the memory location associated with each cube by a decay factor between each insonification so as to increase the influence of more recent backscatter data.

33. The method according to claim 30 wherein the method of collecting backscatter data further comprises:

dividing the volumetric area into a plurality of equal size cubes, wherein each cube is identified by row, column and rank;

determining the cube associated with the angle of arrival of the highest amplitude backscatter signal within each range; and adding the magnitude of that particular backscatter signal to the contents of a memory location associated with the cube.

34. The method according to claim 33 wherein the method of collecting backscatter data further comprises multiplying the contents of the memory location associated with each cube by a decay factor between each insonification so as to increase the influence of more recent backscatter data.

* * * * *